(12) United States Patent
Brunn et al.

(10) Patent No.: US 11,140,534 B2
(45) Date of Patent: Oct. 5, 2021

(54) NON-INTRUSIVE PROXIMITY BASED ADVERTISING AND MESSAGE DELIVERY

(71) Applicant: International Business Machines Corporation, Armonk, NY (US)

(72) Inventors: Jonathan F. Brunn, Logan, UT (US); Jeffrey R. Hoy, Gibsonia, PA (US); Marit L. Imsdahl, Cary, NC (US); Asima Silva, Holden, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/840,087

(22) Filed: Dec. 13, 2017

(65) Prior Publication Data

US 2018/0103340 A1 Apr. 12, 2018

Related U.S. Application Data

(63) Continuation of application No. 14/880,206, filed on Oct. 10, 2015, now Pat. No. 9,888,340.

(51) Int. Cl.
*H04W 4/80* (2018.01)
*H04L 29/08* (2006.01)
*H04W 4/21* (2018.01)

(52) U.S. Cl.
CPC ............ *H04W 4/80* (2018.02); *H04L 67/141* (2013.01); *H04W 4/21* (2018.02)

(58) Field of Classification Search
CPC ..................................................... H04W 4/80
USPC ..................................... 455/41.1, 41.2, 41.3
See application file for complete search history.

(56) References Cited

U.S. PATENT DOCUMENTS

| | | | |
|---|---|---|---|
| 8,705,872 B2 | 4/2014 | Ivanich et al. | |
| 8,731,582 B2 | 5/2014 | Weld et al. | |
| 9,888,340 B2 | 2/2018 | Brunn et al. | |
| 2006/0136846 A1 | 6/2006 | Im et al. | |
| 2010/0185949 A1 | 7/2010 | Jaeger | |
| 2011/0169726 A1 | 7/2011 | Holmdahl et al. | |
| 2012/0047011 A1 | 2/2012 | Rippetoe et al. | |
| 2012/0116861 A1 | 5/2012 | Dobyns | |
| 2013/0065526 A1* | 3/2013 | Pottier | H04L 67/34 455/41.2 |
| 2013/0241819 A1 | 9/2013 | Yamashita | |
| 2013/0309964 A1 | 11/2013 | Hall et al. | |
| 2013/0325856 A1 | 12/2013 | Soto Matamala et al. | |

(Continued)

OTHER PUBLICATIONS

Blackmore, "IS Apple's iBeacon at risk of a tragedy of the commons?", The Guardian, downloaded on Oct. 9, 2015 from <http://www.theguardian.com/media-network/2014/may/02/ibeacons-tragedy-commons-marketers>, May 2, 2014.

(Continued)

*Primary Examiner* — Wen W Huang
(74) *Attorney, Agent, or Firm* — Robert C. Bunker

(57) ABSTRACT

Provided are techniques for controlling message delivery corresponding to a near field communication (NFC) device, comprising establishing, on a mobile computing device, a rule-based session corresponding to a NFC device; executing an application, corresponding to the NFC device, in conjunction with the session; and responsive to detecting a condition meeting a criterion corresponding to the rule-based session, limiting execution of the application on the mobile computing device in conformity with the criterion.

17 Claims, 8 Drawing Sheets

(56) References Cited

U.S. PATENT DOCUMENTS

| | | |
|---|---|---|
| 2013/0339345 A1 | 12/2013 | Soto Matamala et al. |
| 2014/0013417 A1 | 1/2014 | Sakai et al. |
| 2014/0188616 A1 | 7/2014 | Badenhop |
| 2014/0298434 A1 | 10/2014 | Prchal |
| 2014/0342760 A1 | 11/2014 | Moldavsky et al. |
| 2015/0079942 A1* | 3/2015 | Kostka ............... G06Q 30/0267 455/411 |
| 2015/0081382 A1* | 3/2015 | L'Heureux ........ G06Q 30/0281 705/7.29 |
| 2015/0140982 A1* | 5/2015 | Postrel .................... H04W 4/12 455/418 |
| 2015/0365486 A1* | 12/2015 | Kotecha .................. H04W 4/80 455/414.1 |
| 2016/0012517 A1 | 1/2016 | Woo |
| 2016/0094940 A1 | 3/2016 | Vigier et al. |

OTHER PUBLICATIONS

Gagliordi, "Apple iBeacon challengers multiply: A look at five rivals," ZDNET, Jun. 24, 2014.

Leswing, "Retailers are exicted abouut beacons, but how fast will they drain your smartphone batery?", gigaom.com, Jul. 9, 2014.

IBM: List of IBM Patents or Patent Applications Treated As Related (Appendix P), Sep. 24, 2019, pp. 1-2.

* cited by examiner

NON-INTRUSIVE PROXIMITY BASED ADVERTISING AND MESSAGE DELIVERY

CROSS-REFERENCES TO RELATED APPLICATIONS

The present application is a continuation and claims the benefit of the filing date of an application entitled, "Nonintrusive Proximity Based Advertising and Message Delivery" Ser. No. 14/880,206, filed Oct. 10, 2015, assigned to the assignee of the present application, and herein incorporated by reference.

FIELD OF DISCLOSURE

The claimed subject matter relates generally to Near Field Communication (NFC) devices typically referred to a "beacons" and, more specifically, to techniques for the management of beacon-related applications.

BACKGROUND OF THE INVENTION

A new technology currently being introduced throughout the world is Near Field Communication (NFC) devices typically referred to as a "beacons." A beacon typically employs Bluetooth low energy (BLE) to transmit a simple message to suitably configured mobile devices such as, but not limited to, a smart telephone. The message transmitted may be a universally unique identifier (UUI) such as an Internet Protocol (IP) address. Once a mobile device receives the UUI, the telephone may execute an application that uses the beacon to establish the location of the telephone relative to the beacon and receive notifications corresponding to the beacon. If the application is not already loaded on the mobile device, the application is typically downloaded from a remote source.

SUMMARY

The claimed subject matter relates generally to Near Field Communication (NFC) devices typically referred to a "beacons" and, more specifically, to techniques for the management of beacon-related applications by the establishment, on a mobile computing device, of a "session" that may manage one or more applications Provided are techniques for controlling message delivery corresponding to a near field communication (NFC) device, such as a beacon. The techniques include establishing, on a mobile computing device, a rule-based session corresponding to a NFC device; executing an application, corresponding to the NFC device, in conjunction with the session; and responsive to detecting a condition meeting a criterion corresponding to the rule-based session, limiting execution of the application on the mobile computing device in conformity with the criterion.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description at the disclosed embodiments is considered in conjunction with the following figures.

DETAILED DESCRIPTION

Figure 1:
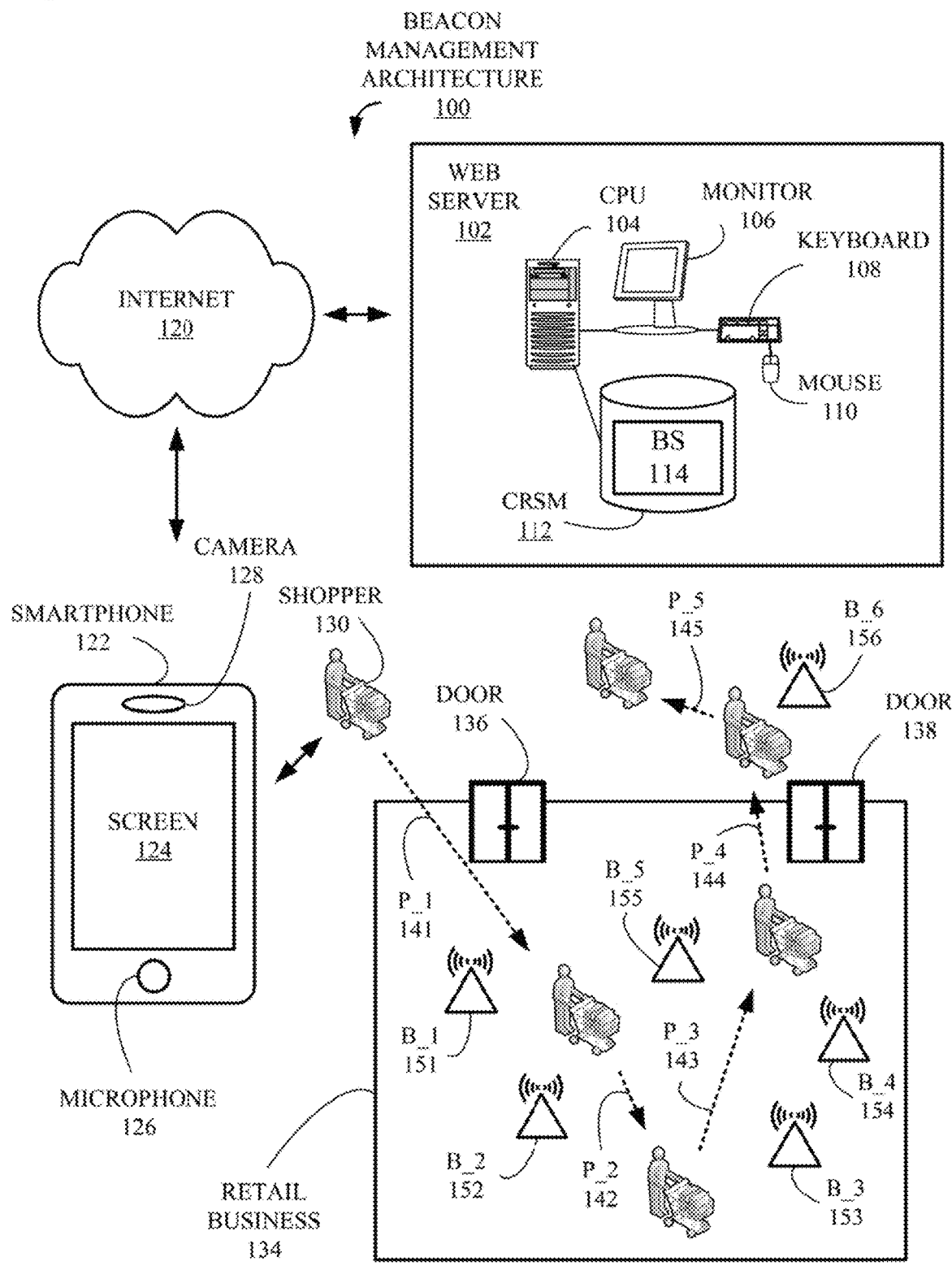
FIG. 1 is a block diagram of a Beacon Management architecture (BMA) configured in accordance with an embodiment of the claimed subject matter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Turning now to the figures, FIG. 1 is a block diagram of one example of a Beacon Management architecture (BMA) 100 in which the claimed subject matter may be implemented. A web server 102 includes a central processing unit (CPU) 104, which would typically include one or more processors (not shown), coupled to a monitor 106, a keyboard 108 and a pointing device, or "mouse," 110, which together facilitate human interaction with architecture 100 and web server 102. Also included in web server 102 and attached to CPU 104 is a non-transitory computer-readable storage medium (CRSM) 112, which may either be incorporated into web server 102 i.e. an internal device, or attached externally to CPU 104 by means of various, commonly available connection devices such as but not limited to, a universal serial bus (USB) port (not shown). CRSM 112 is illustrated storing an example of a beacon server (BS) 114 that stores information related to beacons managed in accordance with the claimed subject matter. Typically, information related to particular beacons is stored on a remote computing device such as web server 102 and transmitted to users by a BS 114 in response to a query related to any particular beacon. For example, a particular beacon at a retail location may have corresponding information related to the description and pricing of a product associated with the beacon stored on BS 114. This information is typically transmitted to a user's mobile device in response to a request to download the information. The claimed subject matter enables, among other features, a user to control whether or not a request is made and the timing of requests for information, thus preventing the user from being presented with extraneous information. It should be noted that a typical architecture may include many web servers servicing many beacons but for the sake of simplicity only one beacon server is shown.

Web server 102 and CPU 104 are connected to the Internet 120, which is also connected to a mobile computing device, or in this example, a smartphone 122. Smartphone 122 includes a display, or "screen," 124, a microphone 126 and a camera 128. Although in this example, web server 102 and smartphone 122 are illustrated communicatively coupled to the Internet 120, the connection would typically be made via any number of communication mediums such as, but not limited to, a WiFi network (not shown) or a cellular telephone network (not shown). In addition, the functionality of the claimed subject matter doesn't necessarily depend upon a connection to the Internet and other connections between smartphone 122 and web server 102 are also possible. Further, it should be noted there are many possible configurations for a BMA, of which architecture 100 is only one simple example.

Also illustrated in FIG. 1, is an example of a scenario in which the claimed subject matter may be employed. A retail business 134 is used throughout the Specification to describe some of the functionality associated with the disclosed technology. In the example, retail business 134 has two (2) doors, i.e. a door 136 and a door 138, through which a shopper 130 may enter and exit retail business 134. Although shopper 130 is illustrated at various positions throughout retail business 134, shopper 130 is only labeled at a beginning position of a path walked that consists of five (5) portions, i.e., a P_1 141, a P_2 142, a P_3 143 a P_4 144 and P_5 145, Throughout and in proximity to retail business 134 are positioned several beacons, i.e., a B_1 151, a B_2 152, a B_3 153, a B_4 154, a B_5 155 and a B_6 156. Shopper 130, paths 141-145 and beacons 151-156 are used throughout the Specification to describe aspects of the claimed subject matter.

Figure 2:
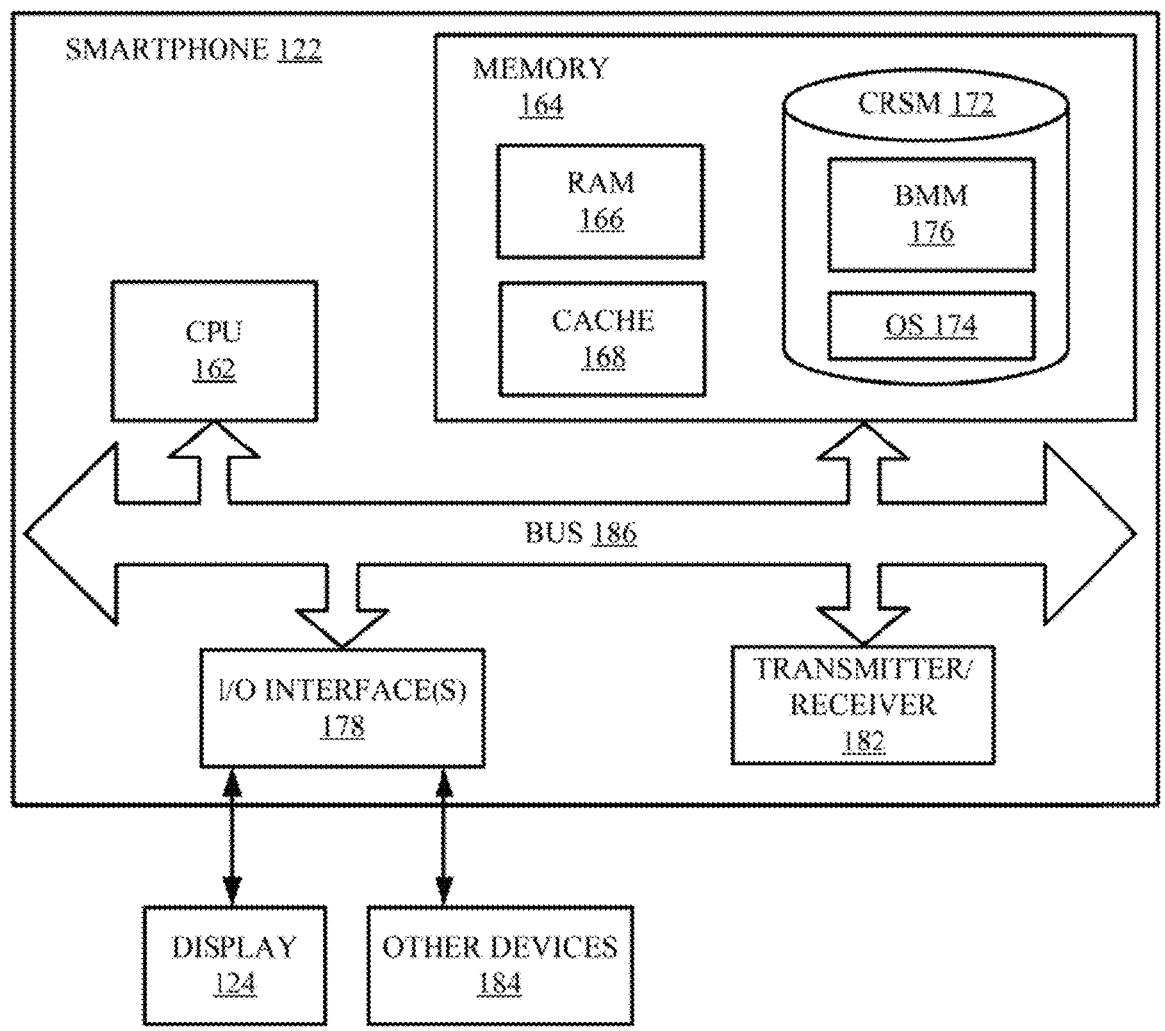
FIG. 2 is a block diagram of a smartphone, first introduced in FIG. 1, in greater detail.

FIG. 2 is a block diagram of smartphone 122, first introduced in FIG. 1, in greater detail. In this example, components of smartphone 122 include a CPU 162, which would include one or more physical processors (not shown), a memory 164, which includes a random access memory (RAM) 166, a cache memory 168 and a non-transitory, computer-readable storage medium (CRSM) 172. CRSM 172 is illustrated as storing an operating system (OS) 174 and a Beacon Management Module (BMM) 176. BMM 176 is responsible for implementing aspects of the claimed subject matter and is described in more detail below in conjunction with FIGS. 3-8.

Also included in smartphone 122 are Input/Output (I/O) interfaces(s) 178 and a transmitter/receiver 182. I/O interface(s) 178 enables smartphone 122 to interact with display 124 (FIG. 1) and other devices 184 that may be attached. Examples of other devices include microphone 126 (FIG. 1) and camera 128 (FIG. 1). Transmitter/receiver 182 enables smartphone 122 to be communicatively coupled to communication mediums such as, but not limited to, a cellular telephone network (not shown) and a WiFi network (not shown). Such connections enable smartphone to be communicatively coupled to other networks and devices such as the Internet 120 (FIG. 1) and web server 102 (FIG. 1). CPU 162, memory 164, I/O interface(s) 178 and transmitter/receiver 182 communicate with each other within smartphone 122 over a communication bus 186.

It should be understood that FIG. 2 is a simplified illustration of a smartphone or any other device that may implement the claimed subject matter. While various components are described to aid in the following description of the disclosed technology, other components, both optional and necessary for the functionality of smartphone 122 may be omitted for the sake of simplicity. Further, smartphone 122 is only one single example of a device that may be configured in accordance with the claimed subject matter. Those with skill in the relevant arts should appreciate that other types of devices, both actual and yet to be developed, may also benefit from the claimed technology.

Figure 3:
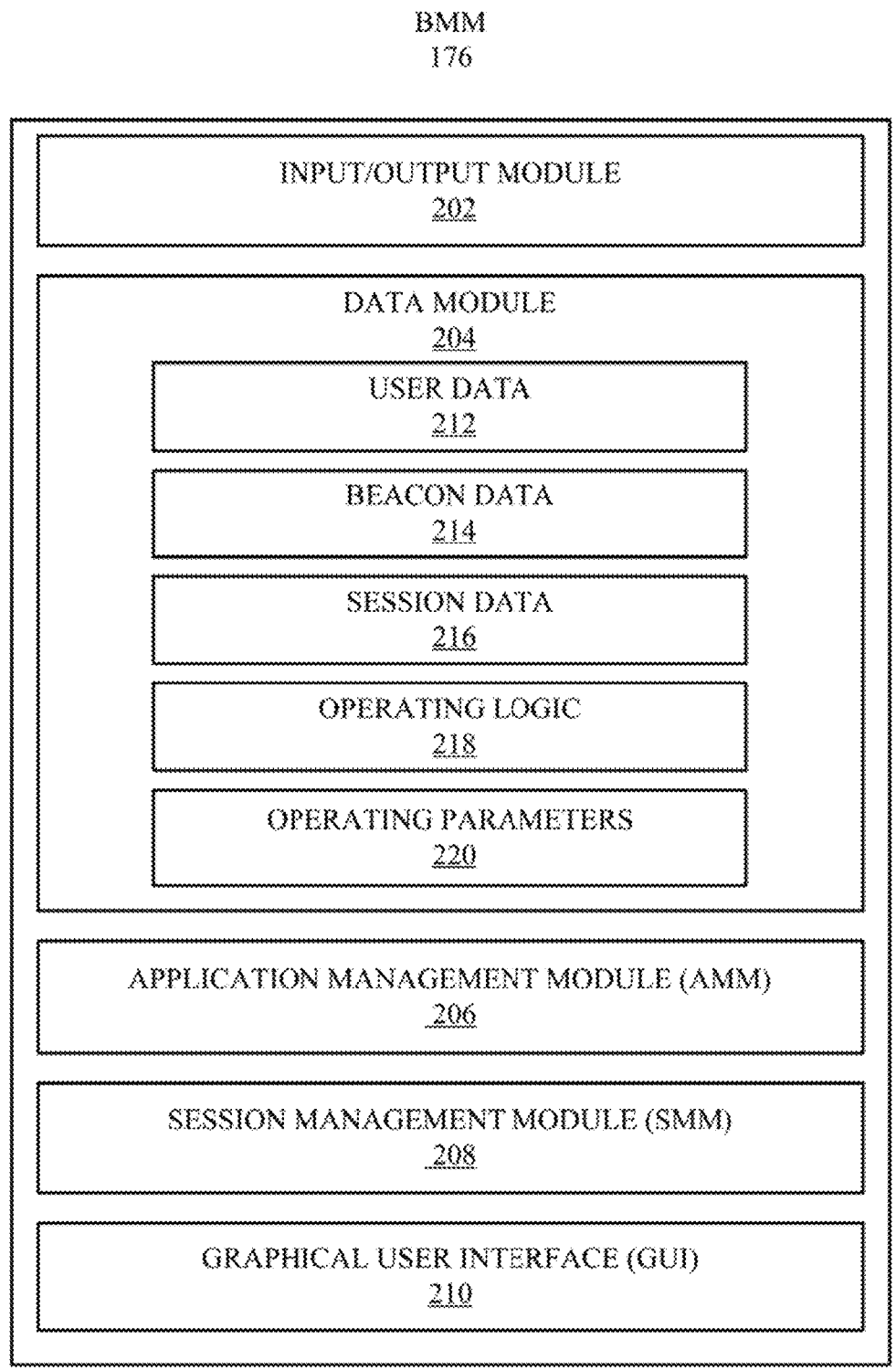
FIG. 3 is a block diagram of a Beacon Management Module (BMM), first introduced in FIG. 2, in greater detail.

FIG. 3 is a block diagram of BMM 176, first introduced in FIG. 2, in greater detail. In this example, logic associated with BMM 176 is stored on CRSM 172 (FIG. 2) and executes on CPU 162 (FIG. 2) of smartphone 122 (FIGS. 1 and 2). It should be understood that the claimed subject matter can be implemented in many types of devices and data storage structures but, for the sake of simplicity, is described only in terms smartphone 122 and architecture 100 (FIG. 1). Further, the representation of BMM 176 in FIG. 3 is a logical model. In other words, components of BMM 176 may be hardware or software stored in the same or separates files and loaded and/or executed within system 100 either as a single system or as separate processes interacting via any available inter process communication (IPC) techniques.

BMM 176 includes an input/output (I/O) module 202, a data module 204, an application management module (AMM) 206, a session management module (SMM) 208 and a graphical user interface (GUI) 210. I/O module 202 handles any communication BMM 176 has with other components of smartphone 122 and architecture 100. Data module 204 is a data repository for information that BMM 176 requires during normal operation. Examples of the types of information stored in data module 204 include user data 212, beacon data 214, session data 216, operating logic 218 and operating parameters 220.

User data 212 stores information that specifies preferences that control the operation of smartphone 122 that have been set by a user of smartphone 122. In the following examples, the user of smartphone 122 is shopper 130 (FIG. 1). Examples of specific elements of user data 212 may include, but are not limited to, parameters that control default timeout and distance restrictions on beacons. Beacon data 214 stores information on specific beacons, which in this example are beacons 151-156 (FIG. 1). Such information may include, but is not limited to, the identity, location, UUI of beacons 151-156 as well as any applications that may be associated with a particular beacon 151-156. Beacon data 214 may also indicate an application for a particular beacon has not yet been downloaded. Session data 216 stores information on any sessions that have been initiated with respect to beacons 151-156. For example, as shopper 130 walks through retail business 134 (FIG. 1), beacons 151-156 are encountered and one or more sessions may be initiated and managed in accordance with the claimed subject matter. The use of user data 212, beacon data 214 and session data 216 is described in more detail below in conjunction with FIGS. 4-8.

Operating logic 218 stores executable code for the implementation of the claimed subject matter on smartphone 122, including the coordination of components 202, 206, 208 and 210. Operating parameters 220 includes information on various user preferences that have been set, including but not limited to, the look and feel of notifications and default values for parameters that may control aspects of the operation of BMM 176.

AMM 206 controls the data that is transmitted to and from beacons 151-156, typically on an application-by-application basis. It should be understood that each of beacons 151-156 would typically be associated with an application, with some applications handling multiple beacons. Data from beacons 151-156 is analyzed by AMM 206 to determine such information as whether or not the beacon has been encountered before, if there is a corresponding session in beacon data 212 and whether or not to initiate a session associated with a particular beacon. AMM 206 also determines whether or not a particular beacon 151-156 is associated with a specific application and whether the application has been or needs to be downloaded. SMM 208 receives signals from AMM 206 and, if necessary, initiates a session to manage the data from a particular beacon 151-156. AMM 206 and SMM 208 and their operation are described in more detail below in conjunction with FIGS. 4-8. GUI component 210 enables users of smartphone 122 and BMM 176 to interact with and to define the desired functionality of BMM 176. Typically, by setting of variables in operating parameters 220.

Figure 4:
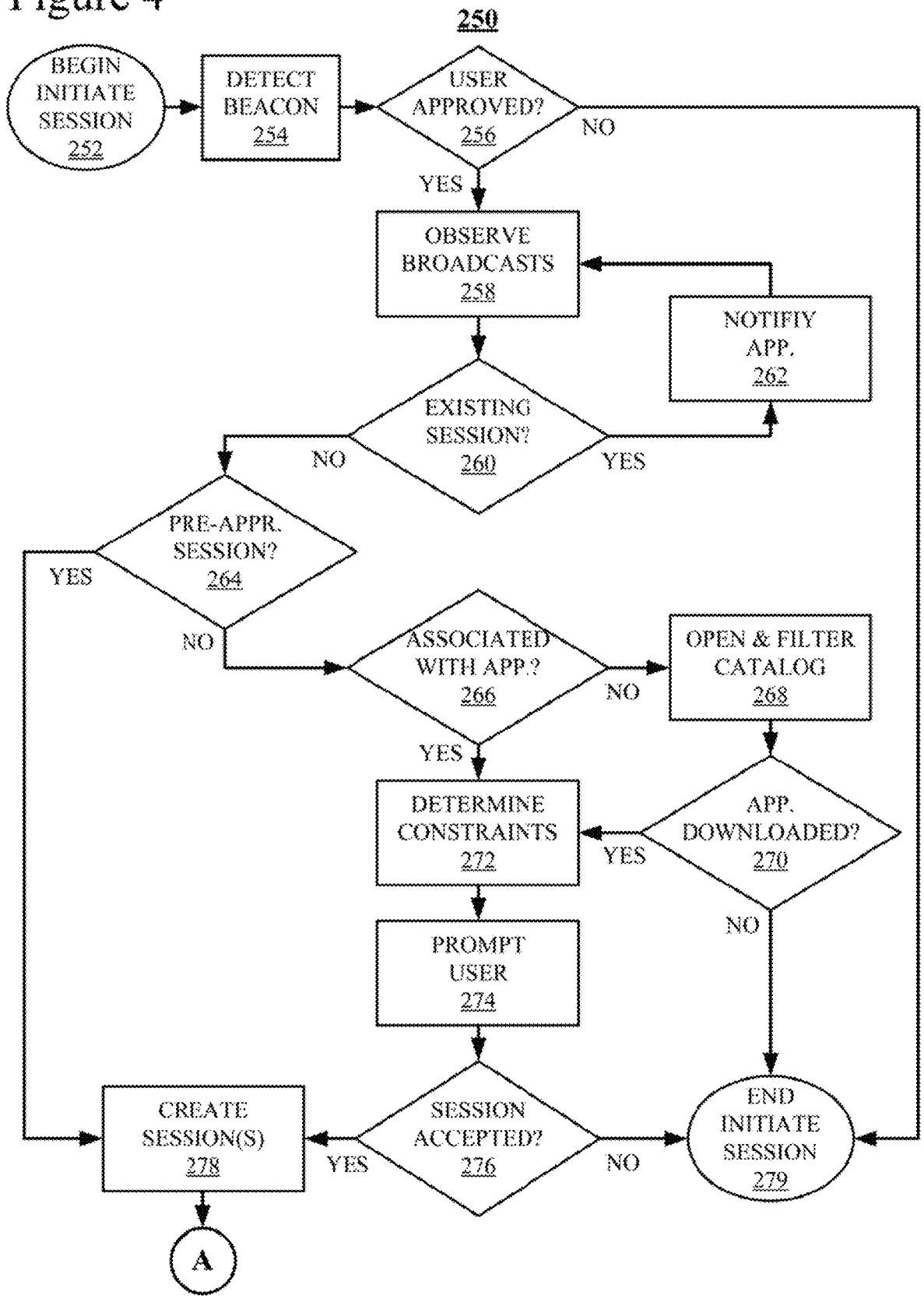
FIG. 4 is a flowchart of one example of an Initiate Session process that may implement aspects of the claimed subject matter.

FIG. 4 is a flowchart of one example of an Initiate Session process 250 that may implement aspects of the claimed subject matter. In this example, logic associated with process 250 is stored on CRSM 172 (FIG. 2) and executed on one or more processors (not shown) of CPU 162 (FIG. 2) and smartphone 122 (FIGS. 1 and 2) in conjunction with BMM 176 (FIGS. 1 and 3). The following description uses shopper 130 (FIG. 1) and beacons 151-156 (FIG. 1) as examples of how the claimed subject matter works and may be implemented.

Process 250 may be initiated in several different ways, depending upon a particular user's configuration. For example, process 250 may be initiated by a different process (not shown) that continually monitors for active beacons within range. In another configuration, a user whom does not wish to be continually interrupted by beacons may explicitly initiate process 250. For example, there might be a sign indicating the potential to interact with a particular beacon, such as a sign at a subway station that uses beacons to augment route maps, or on a store sign advertising a sale. In these examples, the user might take out their phone and initiate a session with a gesture like a shake or swipe, but with the phone not otherwise interacting with beacons.

Process 250 starts in a "Begin Initiate Session" block 252 and proceeds immediately to a "Detect Beacon" block 254. It should be understood that block 254 is only executed once a user has enabled interactions with beacons. In other words, in the event a user has not yet indicated that interaction with beacons is acceptable, control may proceed immediately to a "User Approved?" block 256 and, instead of detecting beacons, process 250 detects an explicit signal from the user that beacon interaction should be initiated. During processing associated with block 254, shopper 130 has come within range of one or more of beacons 151-156, which in this example are B_1 151. It should be noted that more than one beacon may be detected at a particular time and that, if so, process 250 only illustrates the beacons being processing one at a time although in an alternative processing scenario multiple beans may be processed concurrently.

During processing associated with "User Approved?" block 256, a determination is made as to whether or not B_1 151 is associated with any particular currently active session on smartphone 122. In addition, a user such as shopper 130 may initiate an interaction, or indicate a desire not to interact, with a detected beacon that has not previously been encountered via, in this example, smartphone 122 (FIGS. 1 and 2). For example, if B_1 151 is being encountered for the first time, shopper 130 may use a gesture, an entry on screen 124 (FIG. 1), a shake or any other manner in which a user may provide input to smartphone 122 to either initiate or decline the interaction. If shopper 130 has indicated acceptance, either previously or at this point, control proceeds to an "Observe Broadcasts" block 258. During processing associated with block 258, transmissions from B_1 151 are received and, if necessary, stored for further processing as described below.

During processing associated with an "Existing Session?" block 260, a determination is made as to whether or not B-1 151 is associated with an existing session. Such as determination is made by AMM 206 (FIG. 3) and SMM 208 (FIG. 3) with reference to beacon data 214 (FIG. 3) and session data 216 (FIG. 3). If there is an existing session, control proceeds to a "Notify Application (App.)" block 262, the transmission is forwarded to the application corresponding to the existing session and control returns to block 258. If, during processing associated with block 260, a determination is made that the broadcast observed during processing associated with block 258 is not associated with an existing session, control proceeds to a "Pre-Approved (Pre-Appr.) Session?" block 264. During processing associated with block 264, a determination is made as to whether or not B_1 151 has been "pre-approved" for a session. In other words, a user has already specified that a beacon is approved and the constraints associated with the beacon have already been specified, typically because of permissions of the application to which the session will be associated. Application permissions may have been created explicitly in a permissions or settings page, or as part of a previous session initiation with the same or another beacon where the user granted future permissions while creating a session. If a determination is made that a session is not pre-approved, control proceeds to an "Associated With App.?" block 266.

During processing associated with block 266, a determination is made as to whether or not the pre-approved session is already associated with an application. If not, control proceeds to an "Open & Filter Catalog" block 268. During processing associated with block 268, a relevant application catalog is accessed and the available applications are filtered to present shopper 130 with the selection form among the applications that are relevant to B_1 151. During processing associated with an "App. Downloaded?" block 270, a determination is made as to whether or not the application or applications a user has selected during processing associated with block 268 have been able to be downloaded. Upon download of an application, relevant beacon information is passed from the time the session was initiated, along with a note on initiation time. This may differ from the current beacon broadcast information as downloading an application may take some time. The application may choose to use this information how it desires, either presenting information relevant to the user's original location when they initiated the session or the new location as new beacon information is sent to the application or both.

If one or more apps have been downloaded, or if during processing associated with block 266, a determination is made that the session is already associated with an application, control proceeds to a "Determine Constraints" block 272 during with shopper 130 is able to define any constraints to be placed upon B_1 151 and the associated session and application or applications. Constrains may include, but are not limited to, items such as time constraints, location constraints and application specific constraints corresponding to an application associated with beacon B_1 151.

Constraints may come from either B_1 151 or from the application or applications selected and downloaded during processing associated with block 268 or the application identified during processing associated with block 266. For instance, an application may declaratively describe a specific type of session configuration. The application may also do this in combination with B_1 151. For instance, B_1 151 may automatically be associated with a session of type A. A beacon server may be used to match a beacon to a requested session type, or the application may be invoked programmatically and asked for details on session constraints. The system may also remember settings from the last session associated with the application to determine constraints, and in the absence of specification from any of these means may present a user interlace for shopper 130 to create constraints (which may then be automatically remembered for future sessions). In the case of multiple apps being associated with the beacon the system may find different constraints for each applications.

During processing associated with a "Prompt User" block 274, shopper 130 is given another opportunity to accept the session and the constraints defined during processing associated with block 272. Shopper 130 may be allowed to modify the constraints requested by an application in this block. For instance, the application may request a location based session that terminates when shopper 130 is no longer in proximity with beacons associated with the session. Shopper 130 may add a further constraint that the session will terminate in 15 minutes. Each session associated with an application may be accepted separately or all available sessions may be accepted at once. When multiple applications are found, a condensed summary (such as a fliptych, stack of cards, accordion, or other collapsible control) may be presented to shopper 130 with options to start sessions with any number of applications. The claimed subject matter may enable users to view the session requests from multiple applications and may allow multiple selections to start multiple sessions in one action. The confirmation or acceptance of the session may be indicated with, for example, a gesture, an on-screen tap, touch or swipe motion.

During processing associated with a "Session Accepted?" block 276, a determination is made as to whether or not shopper 130 has accepted the session and constraints during processing associated with block 274. If so, or if during processing associated with block 264, a determination was made that the session was pre-approved, control proceeds to a "Create Session(s)" block 278, during which one or more sessions are created. Creating a session involves creating a record in smartphone 122 recording the session constraints, associated application, start time, location and other metadata about the session.

Several types of sessions may be created. For example, for merchandise beacons, shopper 130 may only want to be notified while they are near a corresponding location. In the case of an event beacon, a user may want to get continuously updated for a beacon giving updates from an event (even though the user may be outside of the specified location). Different settings could be saved as different gestures the user can perform when opening an app. This way be can more easily change the settings without having to change anything on a settings page. Alternatively the user can group the different settings into only two different groups (more notifications/fewer notifications), which the user can specify. This way the user only needs to remember two different gestures to set his settings (i.e. tap versus swipe).

In the case of location based sessions, as long as a user remains in the presence of some beacons associated with a corresponding application, the corresponding session continues to forward notifications. When the device recognizes the user is no longer in proximity with a beacon for a certain amount of time beyond a configurable threshold, the session may be ended with the user receiving no more notifications from the application. A configurable threshold (see 220, FIG. 3) based upon such measurable criterion as radio interference or incomplete coverage hi an area may also temporarily disrupt connections. The disclosed technology may offer benefits beyond location and event based sessions when modifications are made to beacons and applications to work with this technology. In addition, location based sessions may be implemented independent of the other aspects of the disclosed technology without any modification to current beacons or applications.

Once the session has been created during processing associated with block 278 or preapproved during processing associated with block 264, control proceeds to a Transition Point A, which is described in more detail below in conjunction with FIG. 5. Finally, if a session is not accepted during processing associated with block 276, if a determination is made that an appropriate application cannot be downloaded during processing associated with block 270 or interaction with the beacon detected during processing associated with block 254 is declined during processing associated with block 256, control proceeds to an "End initiate Session" block 279 during which process 250 is complete.

Figure 5:
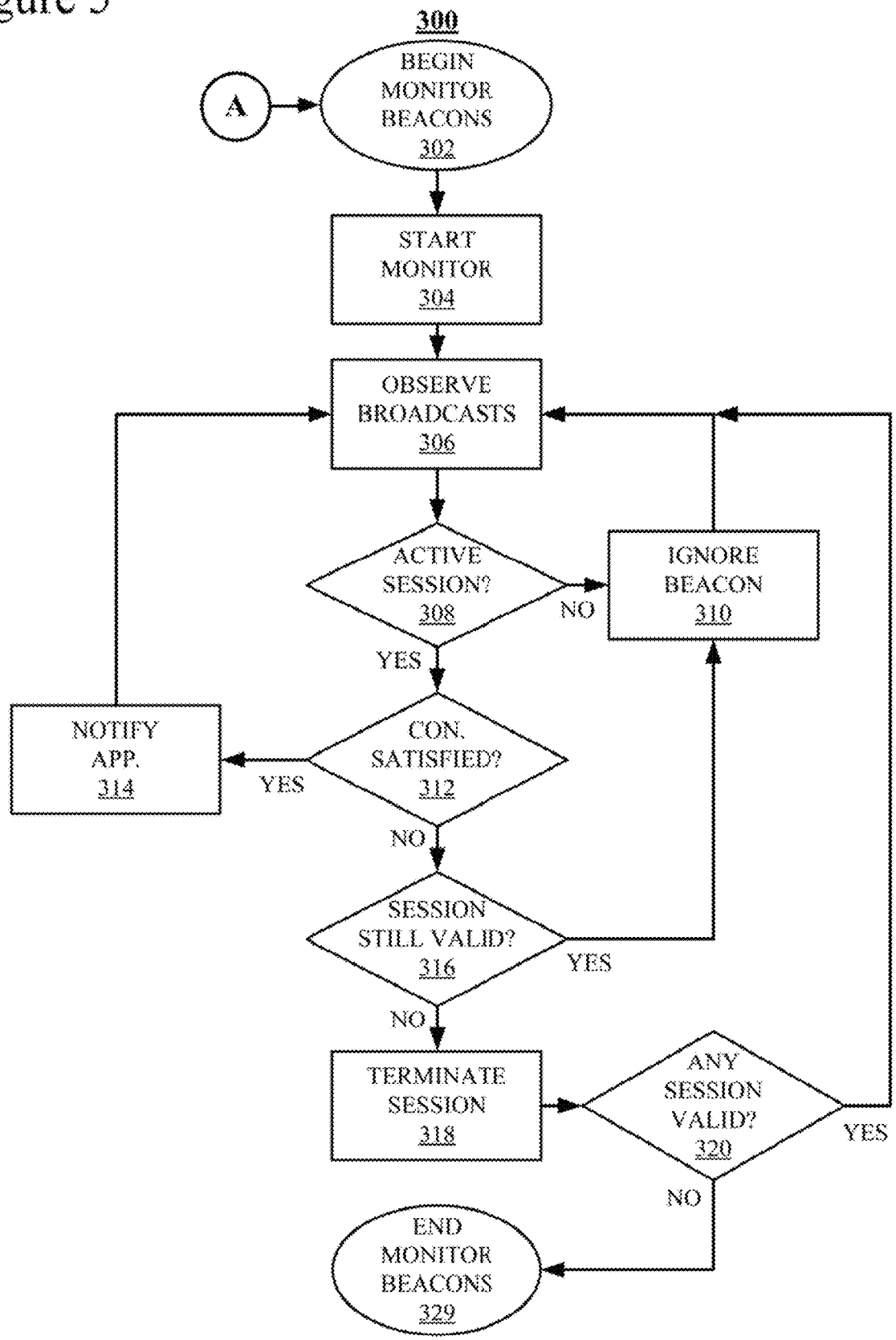
FIG. 5 is a flowchart of one example of a Monitor Beacons process that may implement aspects of the claimed subject matter.

FIG. 5 is a flowchart of one example of a Monitor Beacons process 300 that may implement aspects of the claimed subject matter. Like process 250 (FIG. 4), in this example, logic associated with process 300 is stored on CRSM 172 (FIG. 2) and executed on one or more processors (not shown) of CPU 162 (FIG. 2) and smartphone 122 (FIGS. 1 and 2) in conjunction with BMM 176 (FIGS. 2 and 3). The following description uses shopper 130 (FIG. 1) and beacons 151-156 (FIG. 1) as examples of how the claimed subject matter works and may be implemented.

Process 300 starts in a "Begin Monitor Beacons" block 302 and proceeds immediately to a "Start Monitor" block 304. Process 300 is typically started via Transition Point A (FIG. 4) in response to a session being initiated as described above in conjunction with process 250 (FIG. 4), either by a process (not shown) that continuously monitors for beacons within range or by a user who explicitly initiates process 250.

During processing associated with an "Observe Broadcasts" block 306, smartphone 122 monitors radio frequencies associated with beacons such as beacons 151-156. In response to a transmission being detected, control proceeds to an "Active Session?" block 308 during which process 300 makes a determination is made as to whether or not the signal received during processing associated with block 306 is associated with an active session. This determination is made by correlating the beacon that initiated the signal (see 214, FIG. 3) with a session (see 216, FIG. 3) on smartphone 122 and then, if such a session exists, determining whether or not the session is active. If process 300 determines that the beacon associated with the beacon observed during processing associated with block 306 is not part of an active session, control proceeds to an "Ignore Beacon" block 310. During processing associated with block 310, the transmission is simply ignored and control returns to block 306 and process 300 continues to monitor beacon transmissions.

If, during processing associated with block 308, a determination is made that the signal received during processing associated with block 306 is associated with an active session, control proceeds to "Constraints (Con.) Satisfied?" block 312. During processing associated with block 312, a determination is made as to whether or not the transmission meets criterion corresponding to the constraints placed upon the corresponding session (see 272, FIG. 4). If so, control proceeds to a "Notify App." block 314 during which the broadcast received during processing associated with block 306 is forwarded to the application associated with the active session determined during processing associated with block 308.

If, during processing associated with block 312, a determination is made that the constraints are not satisfied, control proceeds to a "Session Still Valid?" block 316. During processing associated with block 316, a determination is made as to whether or not the corresponding session should be maintained or terminated. For example, a constraint may specify that only certain types of broadcasts are forwarded and that after a certain date no broadcasts are permitted. In that case, if a non-permitted type of broadcast is received prior to the termination date, the broadcast is not forwarded but the session is not terminated. If the session is still valid, control proceeds to Ignore Beacon 310 and processing continues as described above.

If, during processing associated with block 316, a determination is made that the session is no longer valid, control proceeds to a "Terminate Session" block 318 during which the session identified during processing associated with block 308 is terminated. In addition, any applications associated with a particular session would typically be terminated as well. Control then proceeds to an "Any Session Valid?" block 320. During processing associated with block 320, a determination is made as to whether or not there are still any sessions that are active. If so, control returns to block 306 broadcasts are monitored and processing continues as described above. If not, control proceeds to an "End Monitor Beacons" block 329 and process 300 is complete.

Figure 6:
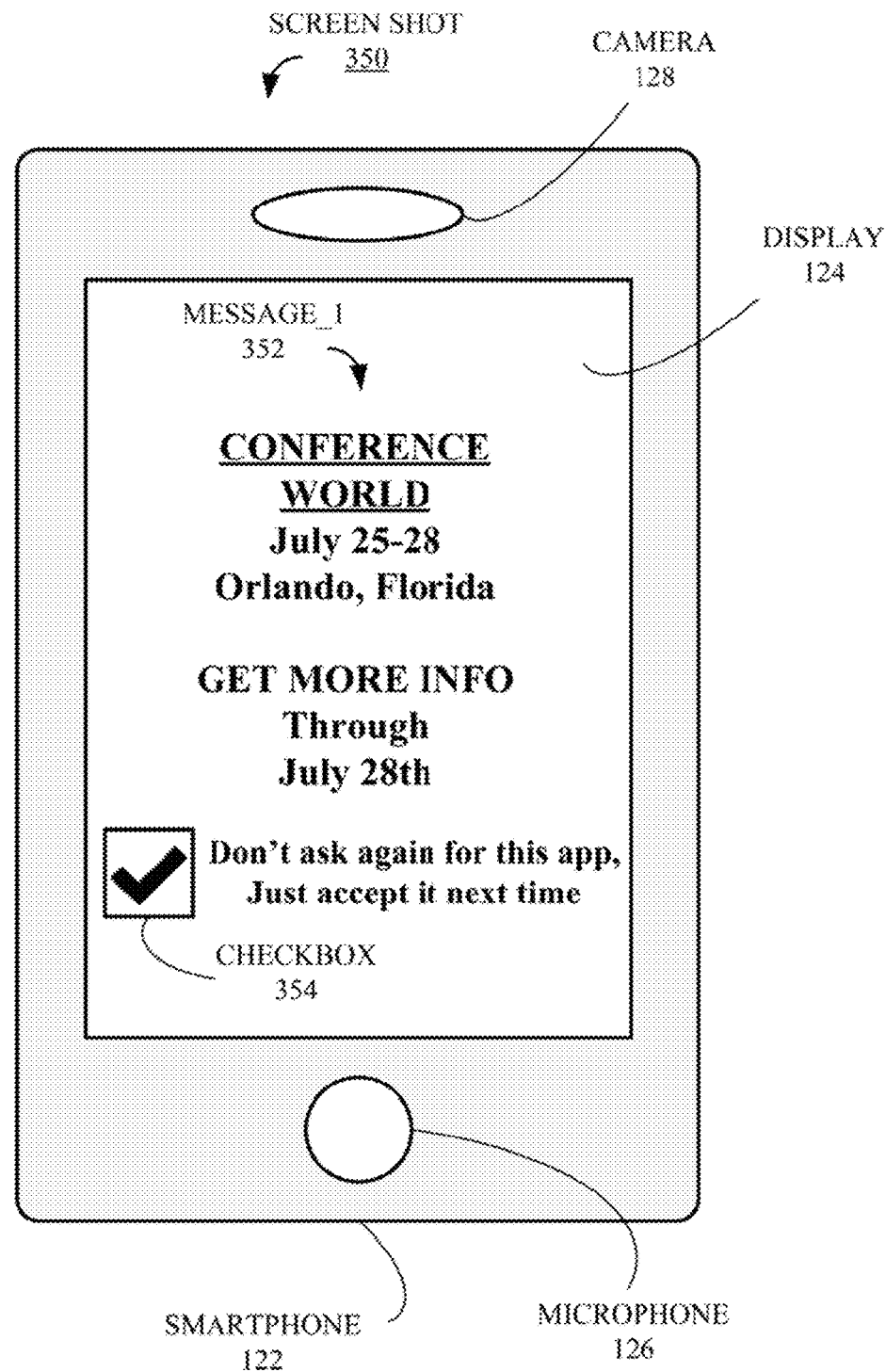
FIG. 6 is an illustration of a smartphone screen shot generated in accordance with the claimed subject matter.

FIG. 6 is an illustration of a screen shot 350 on display 124 (FIG. 1) of smartphone 122 (FIGS. 1 and 2) generated in accordance with the claimed subject matter. Screen shot 350 is showing information in the form of a message_1 352. In addition to display 124, smartphone 122 includes a microphone 126 (FIG. 1) and a camera (FIG. 1) 128. Both microphone 126 and camera 128 provide a user the means to interact with smartphone 122. For example, microphone 126 may detect voice commands and camera 128 may detect gesture-based commands.

In this example, screen shot 350 and message_1 380 are generated by GUI 210 (FIG. 3) of BMM 176 (FIGS. 2 and 3). Message_1 352 provides information about a conference, specifically "*Conference World*, July 25-28, Orlando, Fla." Additional information, i.e., "Get More Info Through July 28$^{th}$," notifies the user that an application associated with this conference includes the constraint that the application, and the session associated with the application, will have the constraint that information will not be provided after July 28$^{th}$. A checkbox 354 enables the user to specify, that the corresponding application should be "pre-approved" by specifying "Don't ask again for this app, Just accept it next time." In this example, the user may touch display 124 to check box 354 and indicate the acceptance of the corresponding constraints by either a verbal or gesture-based command. Although not illustrated, a user may also have pre-designated inputs for frequently used commands. For example, a specific gesture or shaking or telephone 124 may indicate the user desires to "mute" a particular application of beacon, either by temporarily silencing notifications or permanently silencing the application or beacon by terminating a session.

Figure 7:
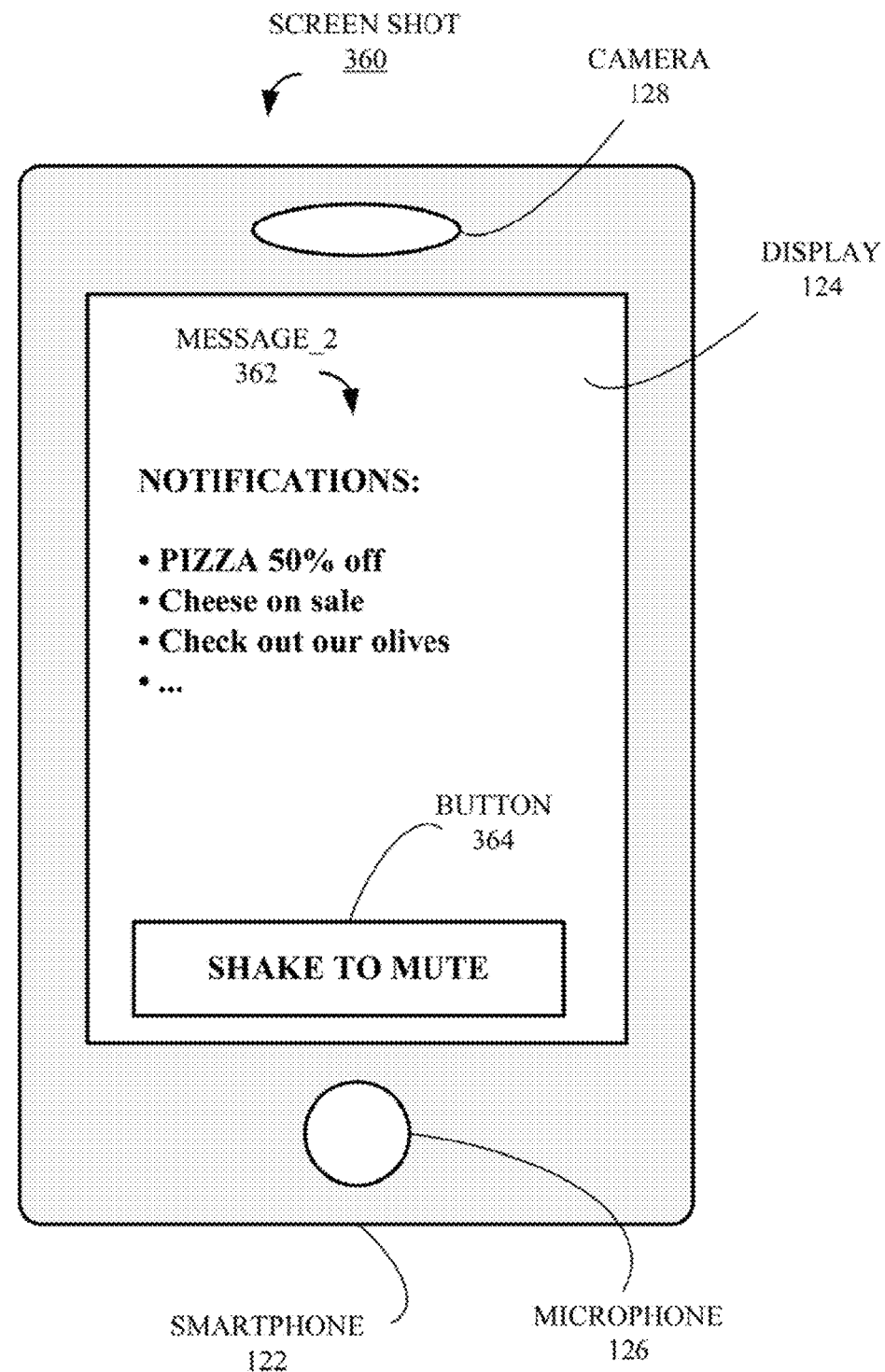
FIG. 7 is an illustration of a second smartphone screen shot generated in accordance with the claimed subject matter.

FIG. 7 is another illustration of a screen shot 360 generated in accordance with the claimed subject matter. Like FIG. 6, FIG. 7 includes smartphone 122 (FIGS. 1 and 2), display 124 (FIG. 1), microphone 126 (FIG. 1) and camera 128 (FIG. 1) and screen shot 360 and message_2 362 are generated by GUI 210 (FIG. 3) of BMM 176 (FIGS. 2 and 3). Message_2 362 includes notifications from a beacon that is associated with an active session. In this example, message_1 362, which might be associated with a pizzeria (not shown), indicates sonic current specials, specifically "Notifications: •PIZZA 50% off; •Cheese on sale; •Check out our olives; • . . . " In addition, a "Shake to Mute" button 364, enables a user to turn off the notifications associated with this particular beacon and session.

Figure 8:
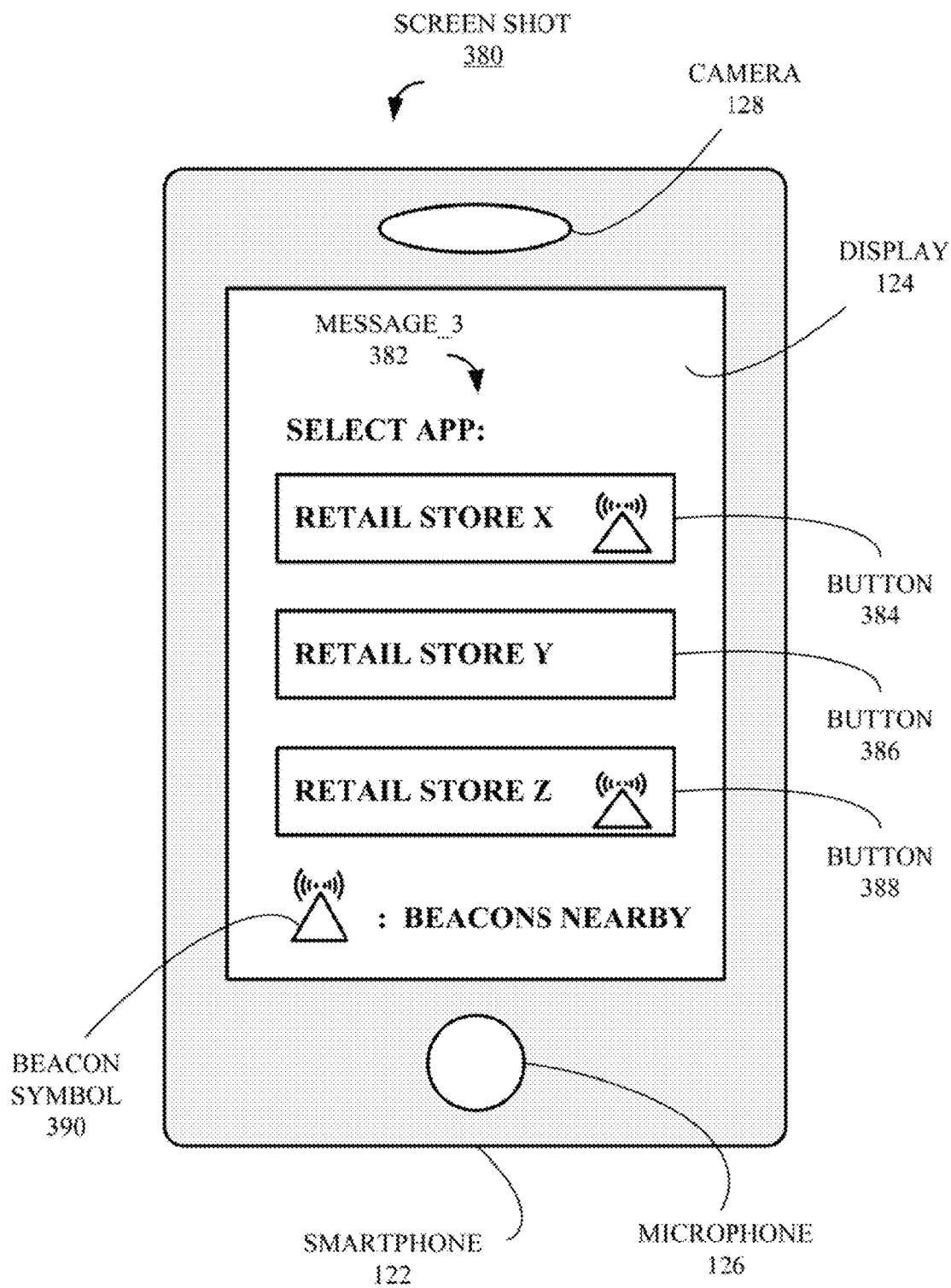
FIG. 8 is an illustration of a third smartphone screen shot generated in accordance with the claimed subject matter.

FIG. 8 is another illustration of a third screen shot 380 generated in accordance with the claimed subject matter. Like FIGS. 6 and 7, FIG. 8 includes smartphone 122 (FIGS. 1 and 2), display 124 (FIG. 1), microphone 126 (FIG. 1) and camera 128 (FIG. 1) and screen shot 360 and message_2 362 are generated by GUI 210 (FIG. 3) of BMM 176 (FIGS. 2 and 3).

In this example, shopper 130 (FIG. 1) has opened an app store (not shown) directly and BMM 176 checks for nearby beacons and then shows applications which can handle those beacons. This is a slightly different process than prompting shopper 130 to download the app when in the presence of a beacon and is triggered by the user opening an app store or catalog. When searching for apps, a visual indicator may be shown of the app can handle a nearby beacon.

Message_3 382 enables a user to select applications associated with three different retail stores for three detected beacons. In this example, a user is prompted to "Select APP:" associated with a "Retail Store X," a "Retail Store Y" and a "Retail Store Z." A button 384 enables acceptance of an application associated with Retail Store 1, a button 386 with an application associated with Retail Store Y and a button 388 with an application associated with Retail Store Z. A line along the bottom of message_1 382 indicates that "Beacons Nearby" are indicated by a symbol 390, as indicated in buttons 384 and 388.

Some features provided by the claimed technology include, but are not limited to, session-based interactions that span multiple beacons, gesture-based session initiation and termination, privacy/information overload/noise protection through sessions, location-based sessions and time-based sessions The disclosed technology provides a novel and much improved user experience around beacons, puts more control in the hands of the user over which notifications they receive and greatly reduces unwanted notifications and notification overload. In addition, the technology has an added advantage of improving battery life and data usage by reducing the times when a device needs to interact with beacons and times when application code related to beacons is called.

The disclosed techniques also improve on the adoption of beacon technology. Current beacon approaches discourage widespread use of beacon enabled applications, or "apps," due to potential notification overload, requiring users to be selective with the apps allowed to interact with beacons and the corresponding notifications. Unlike the claimed subject matter, current approaches also typically require the advance downloading of an application to interact with beacons.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for controlling message delivery corresponding to a near field communication (NFC) device, comprising:
   establishing, on a mobile computing device of a user, a rule-based session corresponding to a NFC device;
   detecting, by the mobile computing device, that an application associated with the session is approved by the user based on a prior user approval of a prior session with the NFC device where the user granted future permissions while creating the prior session in response to a gesture performed by the user, wherein the gesture comprises shaking the mobile computing device to indicate user approval; and
   responsive to detecting a first condition meeting a first criterion corresponding to the rule-based session, limiting, with respect to communication between the NFC device and the mobile computing device, execution of the application on the mobile computing device in conformity with the first criterion, wherein the limiting execution of application comprises preventing the application from transmitting a notification to the user.

2. The method of claim 1, further comprising:
   determining that a second NFC device is not associated with a second session; and
   limiting communication with the second NFC device in response to the determining.

3. The method of claim 1, wherein the limiting of execution of the application comprises preventing the mobile computing device from displaying a message corresponding to the NFC device.

4. The method of claim 1, further comprising adjusting the first criterion based upon interactions by a user of the mobile computing device.

5. The method of claim 1, the first criterion selected from a list, the list consisting of:
   a time constraint; and
   an application specific constraint corresponding to an application associated with the NFC device.

6. The method of claim 1, wherein the NFC device is a beacon.

7. The method of claim 1, further comprising:
   determining that the application is not loaded on the mobile computing device; and
   in response to the determining that the application is not loaded, downloading the application onto the mobile computing device.

8. An apparatus for controlling message delivery corresponding to a near field communication (NFC) device, comprising:
   a processor;
   a computer-readable storage medium coupled to the processor; and
   instructions, stored on the computer-readable storage medium and executed on the processor, to perform a method, the method comprising:
      establishing, on a mobile computing device of a user, a rule-based session corresponding to a NFC device;
      detecting, by the mobile computing device, that an application associated with the session is approved by the user based on a prior user approval of a prior session with the NFC device where the user granted future permissions while creating the prior session in response to a gesture performed by the user, wherein the gesture comprises shaking the mobile computing device to indicate user approval; and
      responsive to detecting a first condition meeting a first criterion corresponding to the rule-based session, limiting, with respect to communication between the NFC device and the mobile computing device, execution of the application on the mobile computing device in conformity with the first criterion, wherein the limiting execution of application comprises preventing the application from transmitting a notification to the user.

9. The apparatus of claim 8, the method further comprising:
   determining that a second NFC device is not associated with a second session; and
   limiting communication with the second NFC device in response to the determining.

10. The apparatus of claim 8, wherein the limiting of execution of the application comprises preventing the mobile computing device from displaying a message corresponding to the NFC device.

11. The apparatus of claim 8, further comprising adjusting the first criterion based upon interactions by a user of the mobile computing device.

12. The apparatus of claim 8, wherein the NFC device is a beacon.

13. A computer programming product for controlling message delivery corresponding to a near field communication (NFC) device, comprising a non-transitory computer-readable storage medium having program code embodied therewith, the program code executable by a plurality of processors to perform a method comprising:
   establishing, on a mobile computing device of a user, a rule-based session corresponding to a NFC device;
   detecting, by the mobile computing device, that an application associated with the session is approved by the user based on a prior user approval of a prior session with the NFC device where the user granted future permissions while creating the prior session in response to a gesture performed by the user, wherein the gesture comprises shaking the mobile computing device to indicate user approval; and
   responsive to detecting a first condition meeting a first criterion corresponding to the rule-based session, limiting, with respect to communication between the NFC device and the mobile computing device, execution of the application on the mobile computing device in conformity with the first criterion, wherein the limiting execution of application comprises preventing the application from transmitting a notification to the user.

14. The computer programming product of claim 13, the method further comprising:
   determining that a second NFC device is not associated with a second session; and
   limiting communication with the second NFC device in response to the determining.

15. The computer programming product of claim 13, wherein the limiting of execution of the application comprises preventing the mobile computing device from displaying a message corresponding to the NFC device.

16. The computer programming product of claim 13, further comprising adjusting the first criterion based upon interactions by a user of the mobile computing device.

17. The computer programming product of claim 13, wherein the NFC device is a beacon.

\* \* \* \* \*